United States Patent
Galera et al.

(10) Patent No.: US 9,696,424 B2
(45) Date of Patent: Jul. 4, 2017

(54) OPTICAL AREA MONITORING WITH SPOT MATRIX ILLUMINATION

(71) Applicant: Rockwell Automation Technologies, Inc., Mayfield Heights, OH (US)

(72) Inventors: Richard Galera, Nashua, NH (US); Anne Bowlby, Lowell, MA (US); Derek W. Jones, Galloway (GB); Nilesh Pradhan, South Grafton, MA (US); Francis L. Leard, Sudbury, MA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 41 days.

(21) Appl. No.: 14/553,363

(22) Filed: Nov. 25, 2014

(65) Prior Publication Data
US 2015/0331107 A1  Nov. 19, 2015

Related U.S. Application Data

(60) Provisional application No. 62/000,484, filed on May 19, 2014.

(51) Int. Cl.
*G06K 9/00* (2006.01)
*G01S 17/02* (2006.01)
(Continued)

(52) U.S. Cl.
CPC ............ *G01S 17/026* (2013.01); *G01S 17/89* (2013.01); *G01V 8/00* (2013.01); *G06K 9/209* (2013.01);
(Continued)

(58) Field of Classification Search
CPC .................. G06T 7/408; G06T 7/0081; G06T 2207/10024; G06K 9/4652;
(Continued)

(56) References Cited

U.S. PATENT DOCUMENTS 4,967,317 A  10/1990 Plumly
5,029,008 A   7/1991 Ferren
(Continued)

FOREIGN PATENT DOCUMENTS

CN  1437063   8/2003
CN  101114021  1/2008
(Continued)

OTHER PUBLICATIONS

Extended European Search Report for EP Application Serial No. 15168237.4, dated Nov. 12, 2015, 8 pages.
(Continued)

*Primary Examiner* — Duy M Dang
(74) *Attorney, Agent, or Firm* — Amin, Turocy & Watson, LLP

(57) ABSTRACT

An imaging sensor device is configured to illuminate a viewing field using an array of focused light spots spaced across the viewing field rather than uniformly illuminating the viewing field, thereby reducing the amount of illumination energy required to produce a given intensity of light reflected from the spots. In some embodiments, the imaging sensor device can project an array of focused light spots at two different intensities or brightness levels, such that high intensity and low intensity light spots are interlaced across the viewing field. This ensures that both relatively dark and relatively bright or reflective objects can be reliably detected within the viewing field. The intensities of the light spots can be modulated based on measured conditions of the viewing field, including but not limited to the measured ambient light
(Continued)

or a determined dynamic range of reflectivity of objects within the viewing field.

20 Claims, 12 Drawing Sheets

(51) Int. Cl.
    *G01S 17/89* (2006.01)
    *G06K 9/20* (2006.01)
    *G06K 9/60* (2006.01)
    *G06K 9/82* (2006.01)
    *H04N 5/235* (2006.01)
    *H04N 5/225* (2006.01)
    *H04N 5/355* (2011.01)
    *H04N 13/02* (2006.01)
    *G01V 8/00* (2006.01)

(52) U.S. Cl.
    CPC .............. *G06K 9/605* (2013.01); *G06K 9/82* (2013.01); *H04N 5/2256* (2013.01); *H04N 5/2355* (2013.01); *H04N 5/35563* (2013.01); *H04N 13/025* (2013.01); *H04N 13/0207* (2013.01); *H04N 13/0257* (2013.01); *G06K 2209/21* (2013.01); *G06K 2209/401* (2013.01)

(58) Field of Classification Search
    CPC ........ G06F 17/3025; G01S 17/89; F16P 3/14; F16P 3/142; G08B 13/181; G08B 13/183
    See application file for complete search history.

(56) References Cited

U.S. PATENT DOCUMENTS

| | | | |
|---|---|---|---|
| 5,075,823 | A | 12/1991 | Chomyn |
| 6,235,148 | B1 | 5/2001 | Courson et al. |
| 6,517,213 | B1 | 2/2003 | Fujita et al. |
| 7,255,691 | B2 | 8/2007 | Tolkoff et al. |
| 7,355,179 | B1 | 4/2008 | Wood et al. |
| 7,796,820 | B2 | 9/2010 | Simon et al. |
| 8,224,032 | B2 | 7/2012 | Fuchs et al. |
| 8,253,792 | B2 | 8/2012 | Wells et al. |
| 8,421,037 | B2 | 4/2013 | Leard |
| 8,480,246 | B2 | 7/2013 | Leard |
| 8,531,308 | B2 | 9/2013 | Dickie et al. |
| 9,251,598 | B2 | 2/2016 | Wells et al. |
| 2002/0061134 | A1 | 5/2002 | Cofer et al. |
| 2002/0186299 | A1 | 12/2002 | Cofer |
| 2004/0041984 | A1 | 3/2004 | Tani et al. |
| 2004/0095996 | A1 | 5/2004 | Mossakowski |
| 2004/0150991 | A1 | 8/2004 | Ouderkirk et al. |
| 2004/0150997 | A1 | 8/2004 | Ouderkirk et al. |
| 2004/0233416 | A1 | 11/2004 | Doemens et al. |
| 2005/0207618 | A1 | 9/2005 | Wohler et al. |
| 2006/0227317 | A1 | 10/2006 | Henderson et al. |
| 2007/0217670 | A1 | 9/2007 | Bar-Am |
| 2008/0007709 | A1 | 1/2008 | Bamji et al. |
| 2008/0013821 | A1 | 1/2008 | Macgregor et al. |
| 2008/0144000 | A1 | 6/2008 | Thun et al. |
| 2008/0302951 | A1 | 12/2008 | Aoki et al. |
| 2009/0079841 | A1 | 3/2009 | Leard et al. |
| 2009/0129115 | A1 | 5/2009 | Fine et al. |
| 2009/0245651 | A1 | 10/2009 | Friedhoff et al. |
| 2009/0257241 | A1 | 10/2009 | Meinke et al. |
| 2010/0128109 | A1 | 5/2010 | Banks |
| 2010/0136302 | A1 | 6/2010 | Comanzo et al. |
| 2010/0207762 | A1 | 8/2010 | Lee et al. |
| 2011/0050878 | A1 | 3/2011 | Wells et al. |
| 2011/0051119 | A1 | 3/2011 | Min et al. |
| 2012/0106791 | A1 | 5/2012 | Lim |
| 2012/0146789 | A1 | 6/2012 | De Luca et al. |
| 2012/0146792 | A1 | 6/2012 | De Luca et al. |
| 2012/0293625 | A1 | 11/2012 | Schneider et al. |
| 2012/0330447 | A1 | 12/2012 | Gerlach et al. |
| 2013/0038882 | A1 | 2/2013 | Umeda et al. |
| 2013/0044310 | A1 | 2/2013 | Mimeault |
| 2013/0094705 | A1 | 4/2013 | Tyagi et al. |
| 2013/0155723 | A1 | 6/2013 | Coleman |
| 2013/0182114 | A1 | 7/2013 | Zhang et al. |
| 2013/0194776 | A1 | 8/2013 | Santos et al. |
| 2013/0300835 | A1 | 11/2013 | Kinoshita et al. |
| 2014/0055771 | A1 | 2/2014 | Oggier |
| 2014/0294245 | A1 | 10/2014 | Siilats |
| 2015/0043787 | A1 | 2/2015 | Fredrich et al. |

FOREIGN PATENT DOCUMENTS

| | | |
|---|---|---|
| CN | 102447882 | 5/2012 |
| CN | 103181156 | 6/2013 |
| DE | 102006048166 | 2/2008 |
| DE | 102012021375 | 5/2013 |
| EP | 0835460 | 4/1998 |
| EP | 2642429 | 9/2013 |
| GB | 2319426 | 5/1998 |
| KR | 20130008469 | 1/2013 |
| WO | 2008152647 | 12/2008 |
| WO | 2013135608 | 9/2013 |

OTHER PUBLICATIONS

Office Action dated Dec. 17, 2015 for U.S. Appl. No. 14/509,466, 25 pages.
Notice of Allowance for U.S. Appl. No. 14/553,431, dated Oct. 8, 2015, 25 pages.
Extended European Search Report for EP Application Serial No. 15168239.0, dated Oct. 5, 2015, 10 pages.
Extended European Search Report for EP Application Serial No. 15168119.4, dated Oct. 26, 2015, 9 pages.
Extended European Search Report for EP Application Serial No. 15168241.6, dated Mar. 7, 2016, 8 pages.
Extended European Search Report for EP Application Serial No. 15168237.4, dated Dec. 21, 2015, 2 pages.
Extended European Search Report for EP Application Serial No. 15168239.0, dated Nov. 30, 2015, 2 pages.
Extended European Search Report for EP Application Serial No. 15168119.4, dated Nov. 30, 2015, 2 pages.
Final Office Action for U.S. Appl. No. 14/509,466 dated Apr. 8, 2016, 20 pages.
Notice of Allowance for U.S. Appl. No. 14/943,246, dated Jun. 29, 2016, 42 pages.
Offce Action dated Jul. 29, 2016 for U.S. Appl. No. 14/509,466, 21 pages.
European Office Action for EP Application Serial No. 15168241.6, dated Apr. 11, 16 , 2 pages.
Chinese Office Action and English Translation for CN Patent Application Serial No. 201510256225.8, dated Aug. 19, 2016, 19 pages.
Office Action for U.S. Appl. No. 14/525,125, dated Oct. 21, 2016, 76 pages.
Notice of Allowance for U.S. Appl. No. 14/509,466, dated Dec. 13, 2016, 34 pages.
Chinese Office Action for Application Serial No. 201510256019.7, dated Feb. 27, 2017.
European office Action for Application Serial No. 15/168,119.4 dated Apr. 26, 2017, 9 pages.
Dickens et al., "Pedestrian Detection for Underground Mine Vehicles Using Thermal Images", AFRICON, 2011, IEEE, Sep. 13, 2011 (Sep. 13, 2011), pp. 1-6, XP031990097, DOI: 10.1109/AFRCON.2011.6072167, ISBN: 978-1-61284-992-8.

OPTICAL AREA MONITORING WITH SPOT MATRIX ILLUMINATION

CROSS-REFERENCE TO RELATED APPLICATIONS

This application claims priority to U.S. Provisional Application Ser. No. 62/000,484, filed on May 19, 2014, and entitled "OPTICAL AREA MONITORING WITH SPOT MATRIX ILLUMINATION," the entirety of which is incorporated herein by reference.

BACKGROUND

The subject matter disclosed herein relates generally to optical area monitoring, and, more particularly, to the use of spot matrix illumination by an imaging sensor providing depth measurement of objects and to achieve a high dynamic range for detection and location of objects of different reflectivities and distances within a single image frame.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, an imaging sensor device is provided comprising an illumination component configured to emit a plurality of focused light beams to a viewing space monitored by the imaging sensor device to produce an array of light spots across the viewing space, a photo-receiver array configured to receive reflected light from the viewing space and produce pixel data for an image corresponding to the viewing space based on the reflected light, and an image analysis component configured to determine a location of an object in the viewing space based on analysis of the pixel data.

Also, one or more embodiments provide a method for optically monitoring a viewing field, comprising emitting, by an imaging sensor device comprising at least one processor, a plurality of focused light beams to a viewing field to yield a plurality of light spots across the viewing field; receiving, by the imaging sensor device, reflected light from the viewing field; generating pixel data for an image of the viewing field based on the reflected light; and determining a location of an object in the viewing field based on object location analysis performed on the pixel data.

Also, according to one or more embodiments, a non-transitory computer-readable medium is provided having stored thereon instructions that, in response to execution, cause an imaging sensor device to perform operations, the operations comprising emitting a plurality of focused light beams to a viewing space to produce an array of light spots across the viewing space, receiving reflected light spots from the viewing space, generating pixel data representing the viewing space based on the reflected light, performing determination of object location based on the pixel data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
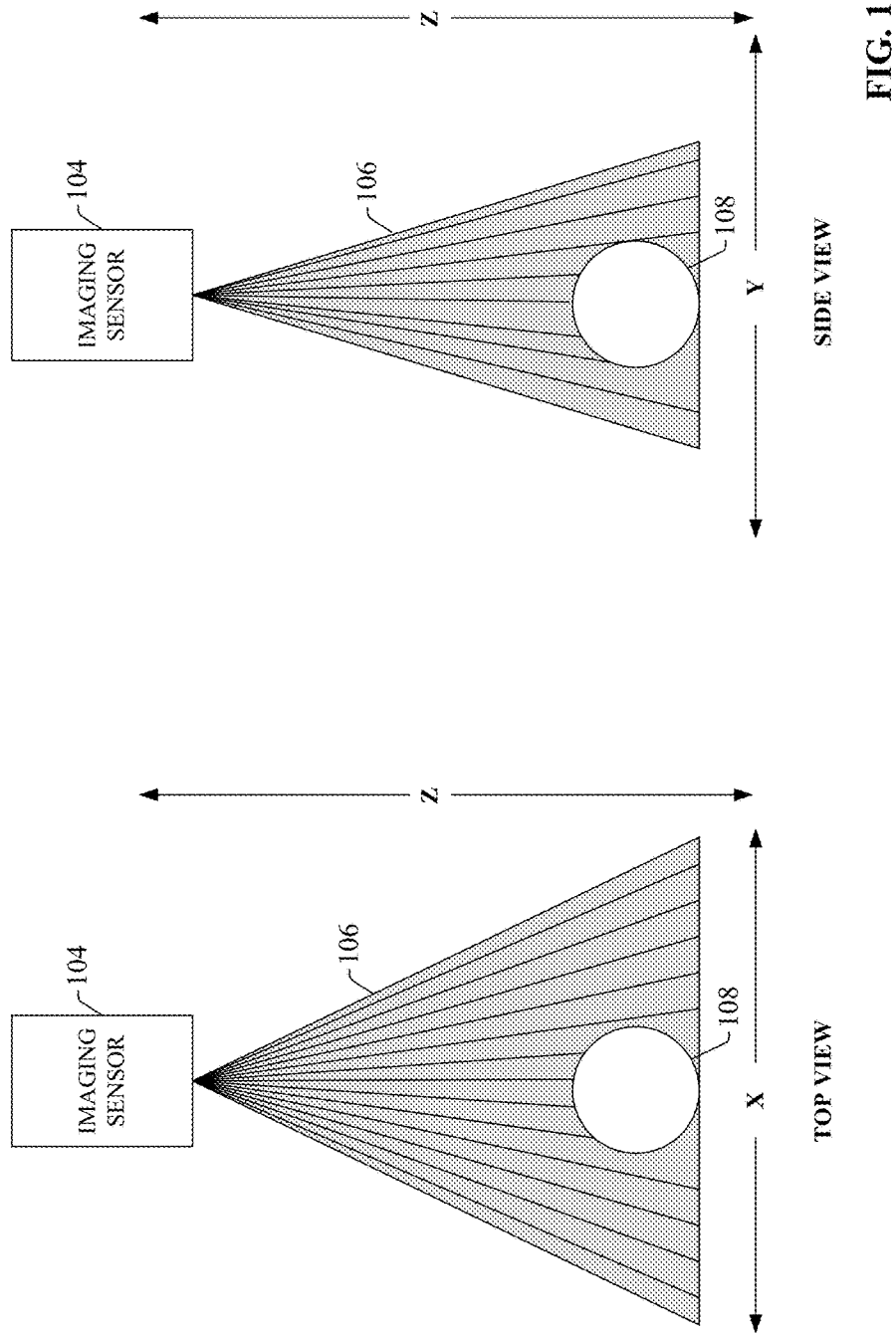
FIG. 1 is a schematic illustrating 2D detection of an object in the X and Y dimensions using a two-dimensional imaging sensor.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates detection of an object 108 using a three-dimensional (3D) image sensor 104. 3D image sensors, also known as time-of-flight (TOF) sensors, are designed to generate distance information in the Z-axis direction as well as two-dimensional shape and location information in the XY plane for objects and surfaces within the sensor's viewing field. For each pixel of an image, TOF sensors measure the elapsed time between emission of a light pulse to the viewing field and receipt of a reflected light pulse at the sensor's photo receiver. Since this time-of-flight information is a function of the distance of the object or surface from the sensor, the sensor is able to leverage the TOF information to determine the distance of the object or surface point from the sensor.

Two-dimensional and three-dimensional imaging sensors typically project a uniform level of illumination toward the viewing field. This level of illumination is generally optimized to the conditions of the viewing field based on such factors as the level of ambient light present in the scene, the degree of reflectivity of objects to be detected, or other considerations. However, when a uniform illumination is applied to a scene containing objects having wide range of reflectivities, the illumination level may not be optimal for detection of some objects within the scene. For example, applying a uniform illumination to a viewing field containing both very dark objects and highly reflective objects may cause saturation of pixels corresponding to the highly reflective objects if the illumination level is optimized to the dark objects, or insufficient signal-to-noise ratio (SNR) for pixels corresponding to the dark objects if the illumination level is highly optimized to the reflective objects.

Moreover, applications requiring detection of objects within a wide viewing angle require a high level of illumination to ensure that the entire viewing area is properly lit for reliable object detection, resulting in high power consumption.

To address these and other issues, one or more embodiments of the present disclosure provide an imaging sensor comprising an illumination system capable of concentrating light into spots spaced across the viewing field, a technique referred to herein as spot matrix illumination. Rather than applying one uniform beam of light over the scene, the imaging sensor projects separate light beams that are focused on specific zones of interest, thereby reducing the amount of power required to illuminate given specific zones of interest within the viewing area without sacrificing reliability of object detection. In general, embodiments of the imaging sensor described herein increase the amount of illumination in the field of view without increasing the power of the source of light. The principle is to concentrate light in spots spaced with a certain distance to insure the detection of objects. The budget of available light using this principle is larger than traditional illumination and a greater dynamic range for detection and location of objects of different reflectivities and distances can be achieved.

Some embodiments of the imaging sensor may also be configured to modulate the illumination intensity of the projected light spots by interlacing spots of high brightness and low brightness across the viewing field, facilitating reliable detection of both bright and dark objects within the scene. Some such embodiments may also be further configured to independently manage the degree of illumination associated with the high brightness and low brightness spots.

Algorithms executed by the imaging sensor can adjust the brightness of the spots between frames based on detected conditions (e.g., a measured degree of ambient light on the viewing field), providing spot-wise and frame-wise degree of flexibility on the amount of light associated with high brightness and low brightness spots.

Figure 2:
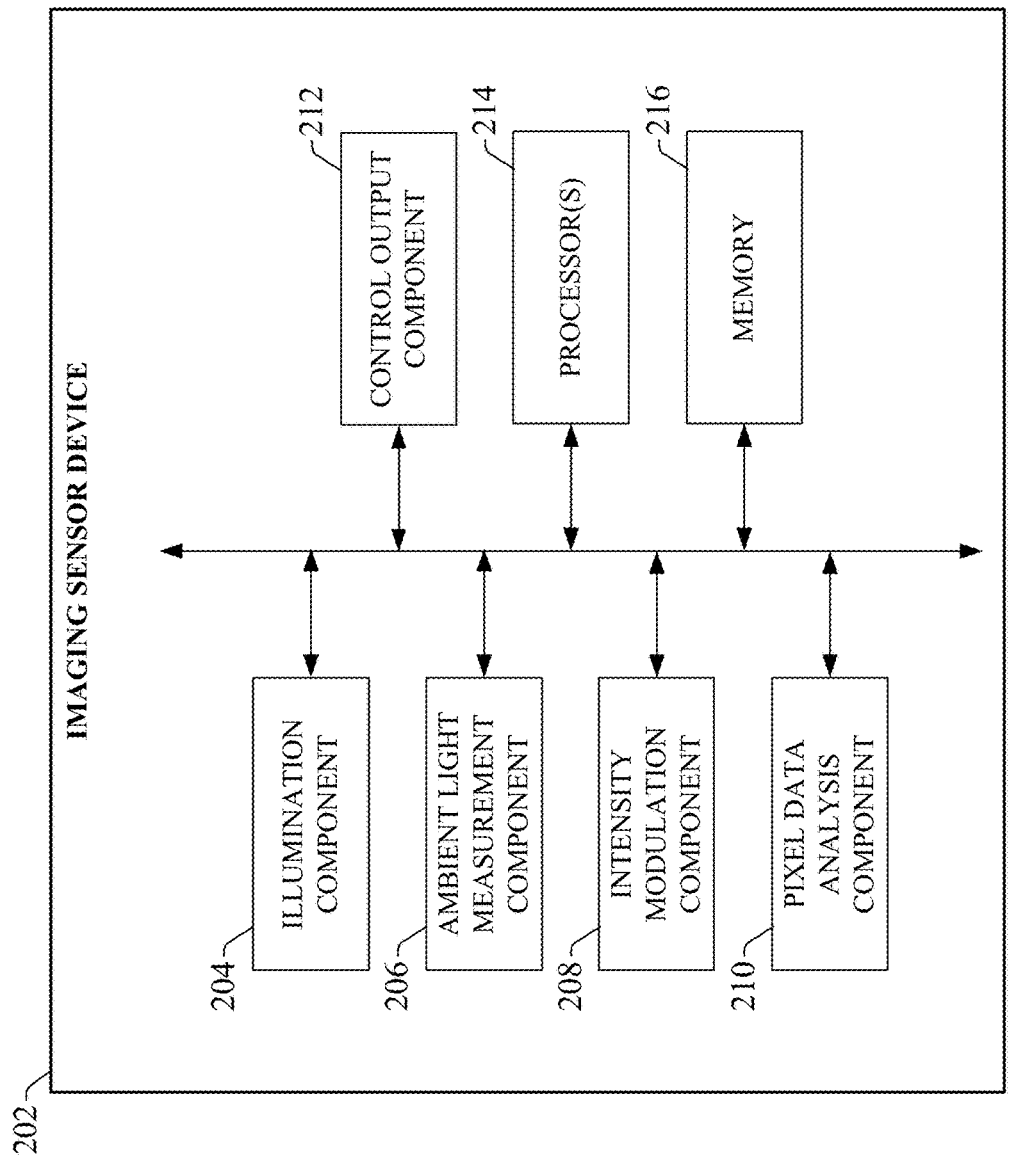
FIG. 2 is a block diagram of an example imaging sensor device.

FIG. 2 is a block diagram of an example imaging sensor device 202 according to one or more embodiments of this disclosure. Although FIG. 2 depicts certain functional components as residing on imaging sensor device 202, it is to be appreciated that one or more of the functional components illustrated in FIG. 2 may reside on a separate device relative to imaging sensor device 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Imaging sensor device 202 can include an illumination component 204, an ambient light measurement component 206, an intensity modulation component 208, a pixel data analysis component 210, a control output component 212, one or more processors 214, and memory 216. In various embodiments, one or more of the illumination component 204, ambient light measurement component 206, intensity modulation component 208, pixel data analysis component 210, control output component 212, the one or more processors 214, and memory 216 can be electrically and/or communicatively coupled to one another to perform one or more of the functions of the imaging sensor device 202. In some embodiments, components 204, 206, 208, 210, and 212 can comprise software instructions stored on memory 216 and executed by processor(s) 214. Imaging sensor device 202 may also interact with other hardware and/or software components not depicted in FIG. 2. For example, processor(s) 214 may interact with one or more external user interface devices, such as a keyboard, a mouse, a display monitor, a touchscreen, or other such interface devices. Imaging sensor device 202 may also include network communication components and associated networking ports for sending data generated by any of components 204, 206, 208, 210, and 212 over a network (either or both of a standard data network or a safety network), or over a backplane.

Illumination component 204 can be configured to control emission of light by the sensor device. Imaging sensor device 202 may comprise a laser, light emitting diode (LED), or remote phosphor emitter light source under the control of illumination component 204 (remote phosphor emitter light sources are described in more detail in co-pending U.S. patent application Ser. No. 14/509,466, the entirety of which is incorporated herein by reference). In particular, illumination component 204 can be configured to focus beams of light in spots spaced across the viewing field, where the size of each spot is defined based on the effective pixel size and the lens characteristics of the receiving element of the imaging sensor device 202. In some embodiments, illumination component 204 may be configured to interlace spots of high brightness and low brightness across the viewing field to facilitate reliable detection of both bright and dark objects within a single frame.

Ambient light measurement component 206 can be configured to detect the amount of ambient light received from the viewing area. The ambient light measurement component 206 can measure, as the ambient light, the light received for pixels between the projected light spots.

Intensity modulation component 208 can be configured to adjust an intensity of the projected light spots based on measured conditions. Some embodiments of the intensity modulation component 208 may modulate the brightness of the light spots based on ambient light measurement data provided by ambient light measurement component 206. For embodiments of the imaging sensor device 202 that support interlacing of high brightness and low brightness spots, the intensity modulation component 208 can be configured to individually modulate the degree of illumination intensity associated with the respective high brightness and low brightness spots based on measured conditions.

The pixel data analysis component 210 can be configured to apply one or both of 2D or 3D image analysis on the image data collected by the imaging sensor device 202 in order to identify objects within the viewing field. For example, the object detection component may perform red-green-blue (RGB) or grayscale analysis of the image pixels—including but not limited to edge detection, contour analysis, image sharpening, contrast adjustment, difference and additive imaging, etc.—to determine the presence of objects within the frame. For imaging sensor devices supporting 3D analysis (time-of-flight analysis), the pixel data analysis component 210 may also be configured to generate distance information for respective pixels to determine the distance of objects from the sensor.

The control output component 212 can be configured to analyze and control one or more sensor outputs based on results generated by the pixel data analysis component 210 (which are derived based on data obtained using the illumination component 204, ambient light measurement component 206, and/or intensity modulation component 208). This can include, for example, sending a control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more persons via a human-machine interface (HMI) or a personal mobile device, sending data over a safety network, or other such output.

The one or more processors 214 can perform one or more of the functions described herein with reference to the systems and/or methods disclosed. Memory 216 can be a computer-readable storage medium storing computer-executable instructions and/or information for performing the functions described herein with reference to the systems and/or methods disclosed.

Figure 3:
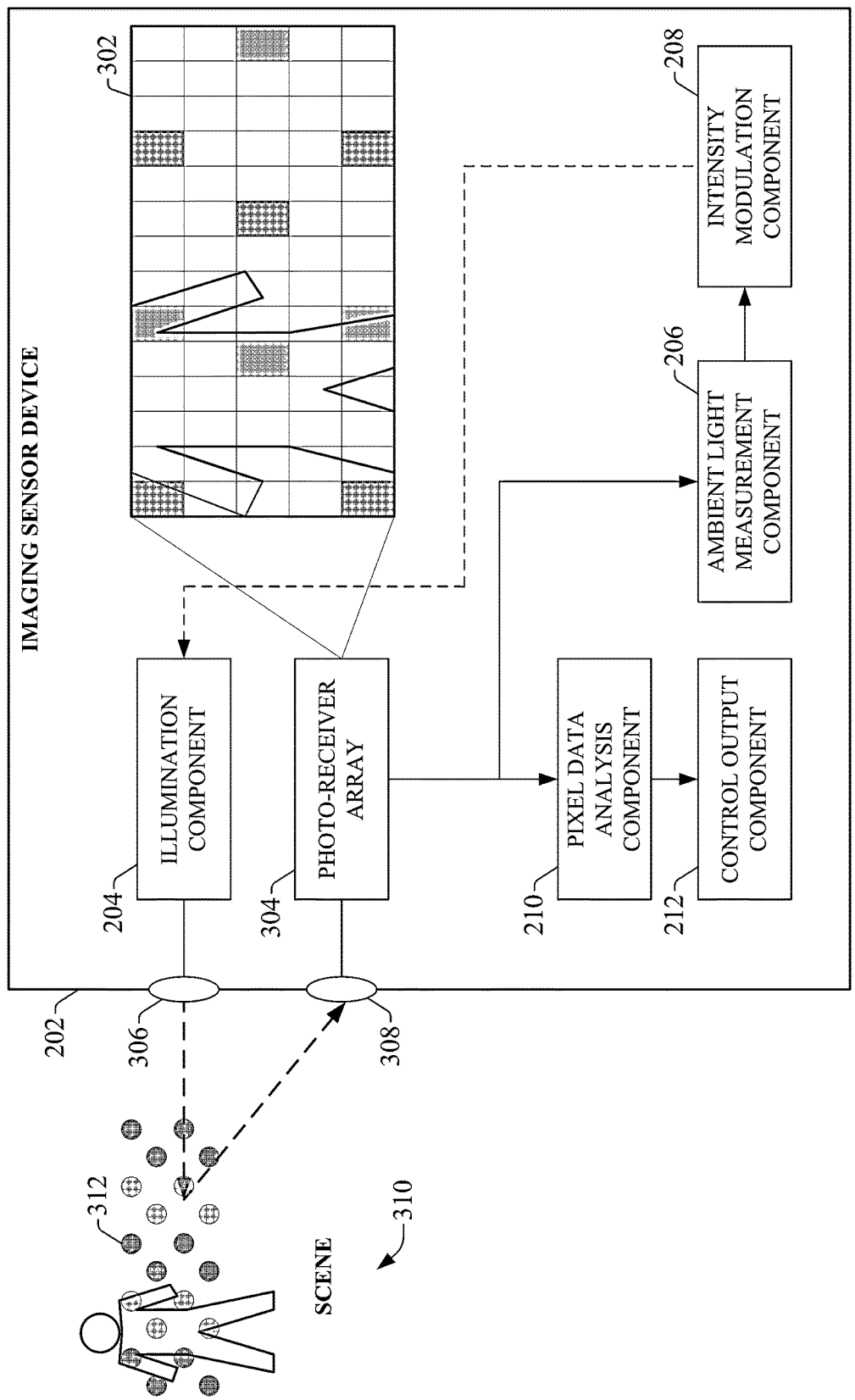
FIG. 3 is a block diagram illustrating components of imaging sensor device.

FIG. 3 is a block diagram illustrating components of imaging sensor device 202 according to one or more embodiments. In this example, illumination component 204 controls emission of LED, laser, or remote phosphor light to the viewing field via emitting lens 306. Illumination component 204 emits light to a viewing field or scene 310 according to a spot matrix illumination technique whereby, rather than uniformly illuminating the scene 310, the illumination component 204 concentrates or focuses light in spots 312 spaced with a certain distance over the viewing area. This technique can improve reliability of detection of small objects and of objects with low reflectivity without increasing the power consumed by the imaging sensor's light source. In such embodiments, the size of each of the light spots 312 can be defined based on the effective size of the pixels and the lens characteristics of the receiving lens element 308 of the imaging sensor device. The receiving lens element 308 is sized relative to the spot size such that the image of a spot on the receiving lens element 308 covers at least the light sensitive area of one pixel.

In a variation of this technique, the illumination component 204 or the emitting lens design can also be configured to modulate the illumination intensity of the emitted spots, such that high brightness spots and low brightness spots are interlaced across the viewing area simultaneously. This technique can facilitate reliable detection of bright and dark objects within a single image frame. In an example implementation, the focused spots of illumination can be achieved by placing an optical structure in front of the LED, laser, or remote phosphor light source. This optical structure may comprise, for example, a squared lenslet or other type of optical element comprising square or rectangular apertures. The lenslet may comprise a flat lens array, or an arrayed lens element on a curved surface. The locations of the apertures on the lenslet define the spot pattern. To ensure accurate detection with small object sizes, the spot pattern can be defined such that at least two horizontal spots and two vertical spots cover the minimum size of object at the given distance from the receiving lens element 308. Other types of optical structures can also be used to generate the focused spots, including but not limited to diffractive optical elements or holographic optical elements.

Receiving lens element 308 receives light reflected from objects and surfaces within the viewing field and directs the reflected light to a photo-receiver array 304. Upon receipt of reflected light at the photo-receiver array 304, pixel data is generated based on the light intensity measured at each photo-receiver in the array, yielding an image 302 that can be processed and analyzed by the imaging sensor device.

Pixel data analysis component 210 can perform one or both of 2D or 3D analysis on the image 302. 2D image analysis can comprise RGB or grayscale analysis of all or portions of the image 302, including but not limited to edge detection, contour analysis, image sharpening, contrast adjustment, difference and additive imaging, etc. The imaging sensor device 202 can employ 2D image analysis to identify objects within the viewing area and determine whether the identified objects correspond to one or more defined object classifications (e.g., a human being, a forklift or trolley, a machined part on a conveyor, a pallet containing packaged products, etc.). In some embodiments, the imaging sensor device 202 may also be configured to perform facial recognition using 2D image analysis, which can be useful for applications in which a control decision or operator feedback output is dependent upon an identity of the person detected within the viewing field.

3D analysis (or time-of-flight analysis) is used to determine a distance of an object or surface in the viewing field corresponding to the pixel of image 302, e.g., using phase shift time-of-flight analysis on a light beam reflected by the object, or using pulsed time-of-flight analysis on a light pulse reflected from the object. Performing distance calculations for each pixel of image 302 yields a 3D point cloud for the selected areas of the viewing field. In some embodiments, imaging sensor device 202 can support both 2D and 3D analysis, and can correlate analysis results to determine, for example, a location, speed, an acceleration and/or trajectory of an identified object within the three-dimensional viewing space.

Depending on the type of application, control output component 212 can generate suitable outputs or operator feedback based on object identity, location, and/or behavior data generated by the pixel data analysis component 210 based on analysis of image 302. In some embodiments, imaging sensor device 202 can interface with an industrial control or safety system, a vehicle safety system, or other such system to implement control features based on object detection. Accordingly, outputs generated by the imaging sensor device can include control instructions to an associated control or safety system (e.g., a programmable logic controller or other safety automation controller, an engine control unit of a mobile vehicle, etc.) to alter operation of a machine or system based on the object data, safety outputs to an associated safety system (e.g., a safety relay) that place an industrial system in a safe state based on the presence and movements of a human being within the viewing field, or other such outputs. Control outputs and messages generated by the control output component 212 can additionally be a function of internal component diagnostics performed by the imaging sensor device 202.

Figure 4:
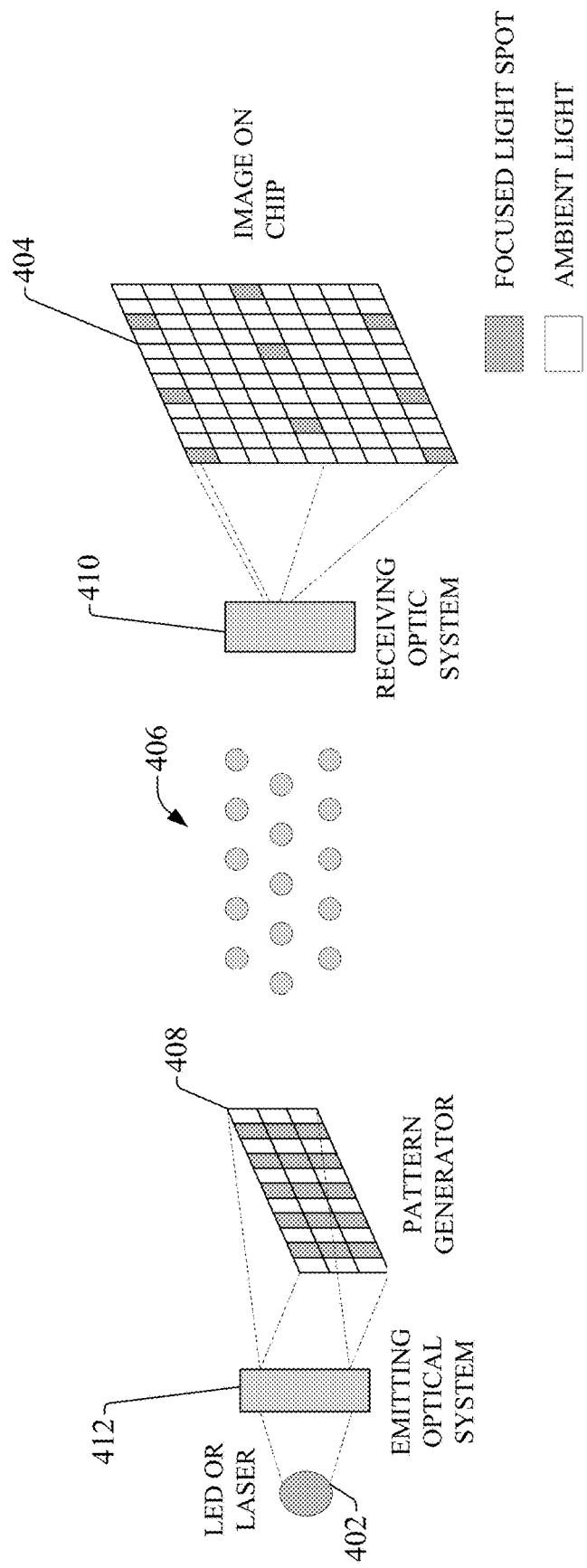
FIG. 4 is a schematic illustrating an example implementation of a spot matrix illumination technique.

FIG. 4 is a schematic illustrating just one example of an implementation of the spot matrix illumination technique. As noted above, illumination component 204 illuminates a scene with a pattern of focused light spots, which can be produced using an integrated pattern generator 408. In some embodiments, the spot pattern can be generated by placing an optical structure (e.g., a squared lenslet, a diffractive optical element, a holographic optical element, etc.) in front of the imaging sensor's emitting optical system 412, which projects light from light source 402 (e.g., an LED, laser, or remote phosphor). The optical structure can comprise lens sections or other elements that focus the light generated by light source 402 to yield the spot pattern 406 across the viewing field. It is to be appreciated that other means for focusing light from light source 402 are within the scope of this disclosure, and that the optical structures described above are not intended to be limiting. The pattern generator 408 can minimize light loss from the light source 402 by dividing and concentrating the light into separately spaced beams, defining a spot pattern in such a way that at least two spots fall within a minimum object size at a given distance from the emitting lens 306.

For example, if a particular sensing application requires detection of objects having a minimum size of 50 mm at 5 meters from the emitting lens, pattern generator 408 can be configured to project the spot pattern 406 such that the distance between adjacent spots is 20 mm. This ensures that at least two light spots will be reflected back to the receiving optical system 410 from a given object within the viewing field, achieving a reliable SNR for objects in the viewing field. Light reflected from the viewing field is received at the receiving optical system 410 of the imaging sensor device, which directs the received light to pixels on which time-of-flight (TOF) analysis is to be performed. The size of each light spot in the pattern 406 and the size of the receiving lens element can be selected such that the image of a dot on the receiving lens element covers at least the light sensitive area of one pixel. In this way, a given pixel of image 404 will correspond to either ambient light received from the viewing field or to a projected light spot.

By focusing light spots on particular areas of interest within the viewing field using pattern generator 408, a lower powered light source can be used relative to uniformly illuminating the scene, without sacrificing the ability to reliably detect objects at the areas of interest.

In some scenarios, a given viewing field may comprise various objects and surfaces having different reflectivities. When illuminating the scene with uniform lighting, the presence of both very dark objects and highly reflective objects within the same viewing field can reduce detection accuracy for some objects within the field. In particular, optimizing the illumination level for highly reflective objects can cause an insufficient amount of reflected light to be received for pixels associated with the dark objects, resulting in insufficient SNR for accurate detection of those objects. Conversely, optimizing the illumination level for darker objects could cause too much light to be received from highly reflective objects in the viewing field, causing saturation of pixels associated with those objects. To address these and other issues, a variation of the spot matrix illumination technique described above can be employed to improve the imaging sensor's dynamic range of object reflectivity. According to this technique, illumination component 204 can modulate the illumination intensity of the spots by interlacing high brightness spots and low brightness spots across the viewing field. Emitting both high brightness and low brightness spots into the viewing field can allow the sensor to detect both bright and dark objects within a single frame.

Figure 5:
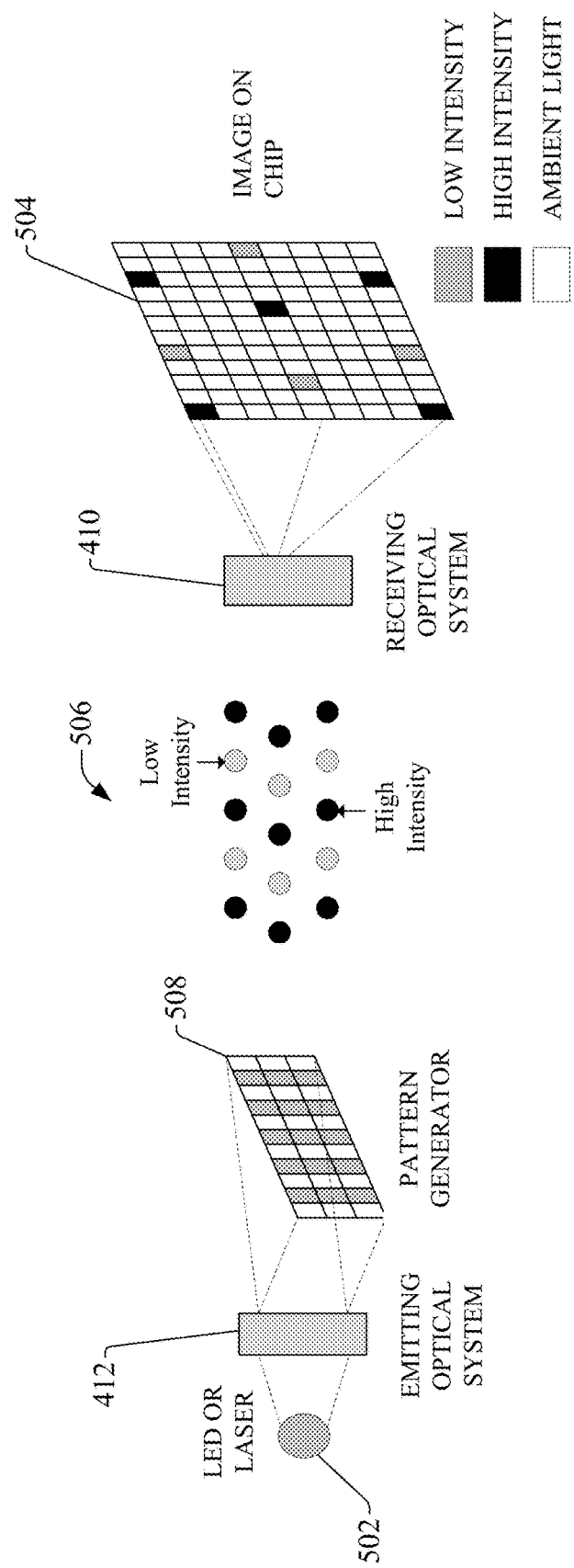
FIG. 5 is a schematic illustrating an example implementation of a spot matrix illumination technique that utilizes interlacing of high brightness and low brightness spots.

FIG. 5 is a schematic illustrating an example implementation of the spot matrix illumination technique that utilizes interlacing of high brightness and low brightness spots. Similar to the example illustrated in FIG. 4, a pattern generator 508 located in front of the emitting optical system 306 of the imaging sensor concentrates light from light source 502 into focused spots of light that are spaced across the viewing field to form spot pattern 506. In this example, pattern generator 508 is configured to control the light from light source 502 such that spot pattern 506 comprises two types of spots—high intensity (or high brightness) spots and low intensity (or low brightness) spots. The high and low intensity spots are interlaced across the viewing field, ensuring accurate detection of both bright and dark objects within a single frame. That is, when the image 504 contains both a dark and a light object, the interlaced pattern 506 of high intensity and low intensity spots ensures that at least one low intensity spot will be reflected by the bright object, causing a suitable amount of light to be reflected from the object and mitigating pixel saturation for the object. Likewise, at least one high intensity spot will fall upon the dark object, ensuring that as sufficient amount of light is reflected by the object to achieve a suitable SNR for that pixel.

Figure 6:
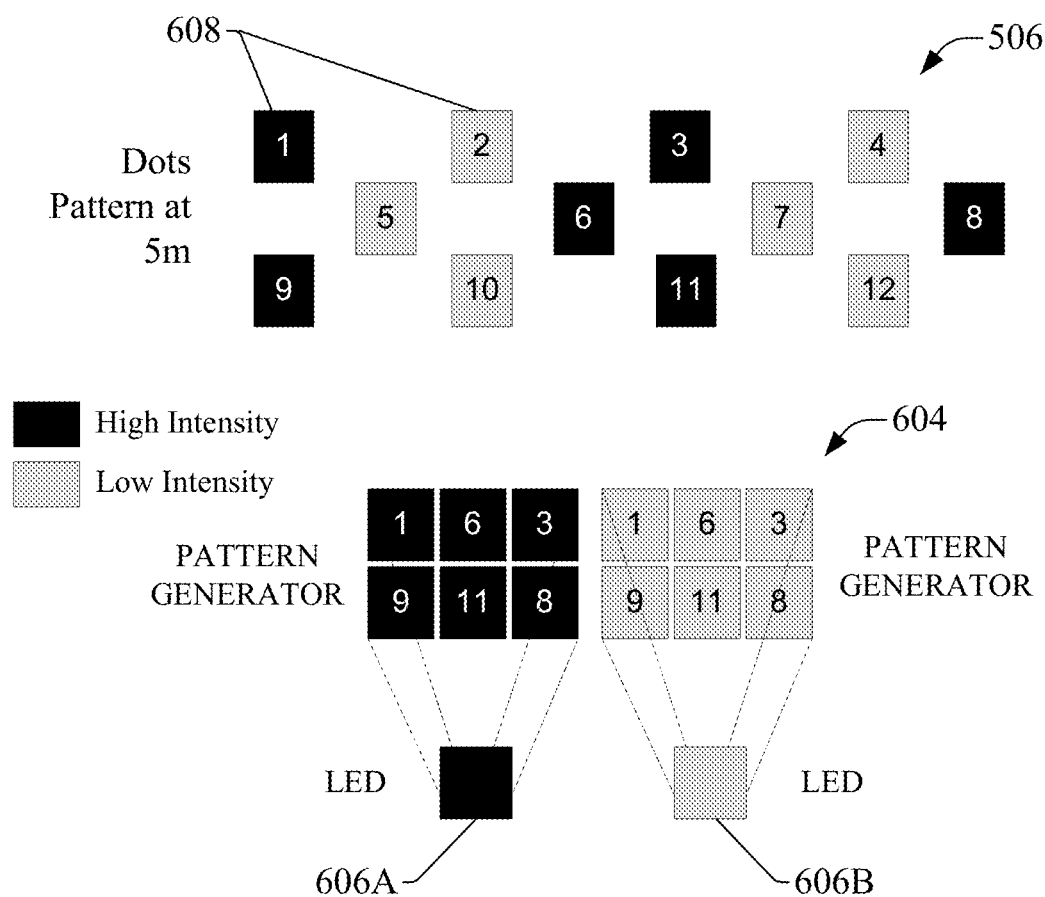
FIG. 6 is a schematic illustrating an example design for projecting a light spot pattern.

Interlacing of high intensity and low intensity light spots can be achieved using any suitable configuration of light source 502 and pattern generator 508. FIG. 6 is a schematic illustrating an example design for projecting spot pattern 506. In this example, two separate LEDs 606A and 606B project light through respective two pattern generators 604. LED 606A projects light at a higher intensity relative to LED 606B. Each pattern generator 604 is configured to concentrate light from its corresponding LED 606 into focused spots 608 to yield a subset of the total spot pattern 506 corresponding to the light intensity of its corresponding LED 606. By placing the two LED/lens pairs side-by-side within the imaging sensor, the high intensity and low intensity sub-patterns generated by the two LED/pattern generator pairs are interlaced across the viewing field when the LEDs 606 emit light through the pattern generators.

This design affords a degree of flexibility regarding the amount of light associated with the high intensity and low intensity spots, since the brightness of each LED 606 can be adjusted individually. In some embodiments, the respective intensity levels of LEDs 606A and 606B can be adjusted by an end user to suit the requirements of the operating environment. Additionally or alternatively, the intensity modulation component 208 of the imaging sensor can automatically adjust the brightness levels of LEDs 606A and 606B as needed based on measured ambient conditions. For example, some embodiments of imaging sensor device 202 can include an ambient light measurement component 206 (see FIG. 3) that measures the ambient light received at photoreceivers corresponding to pixels that fall between the projected high and low intensity spots (e.g., the white pixels of image 504 in FIG. 5). Based on the intensity of ambient light measured by the ambient light measurement component 206, intensity modulation component 208 can modulate the intensity of LEDs 606A and 606B to achieve a signal-to-noise ratio that meets or exceeds a specified SNR. In some scenarios, intensity modulation component 208 may increase or decrease the intensities of LEDS 606A and 606B proportionally, such that the intensity ratio between the high intensity and low intensity spots remains the same. Alternatively, the intensity modulation component 208 may adjust the respective intensities of LEDs 606A and 606B to alter the ratio between high intensity and low intensity spots. Intensity modulation component 208 may alter this intensity ratio based on a determination of the dynamic range required for accurate object detection given the conditions of the viewing field (e.g., based on a measured difference in reflectivity between dark and light objects detected in the viewing field).

The imaging sensor can make such adjustments to LED intensity on a frame-by-frame basis. For example, during processing of a frame of image 504, ambient light measurement component 206 can perform a measurement of ambient light received for one or more of the ambient light pixels of image 504. Additionally, or alternatively, pixel data analysis component 210 may, in addition to performing 3D analysis to determine the location of objects within the frame, determine a brightness ratio (e.g. a degree of the brightness difference) between the brightest object in the frame and the lightest object in the frame. Based on these measured factors, the intensity modulation component 208 can either adjust the intensity of LED 606A and LED 606B in tandem (keeping the brightness ratio between the two LEDs constant), or may adjust the brightness ratio between the two LEDs 606A and 606B to achieve a suitable SNR given the dynamic range of object reflectivities contained in the frame. This adjustment can be performed prior to updating the image pixels for the next frame of the image 504, allowing the imaging sensor to quickly manage a high dynamic range. In some embodiments, rather than performing these measurements and performing the adjustment for each frame, the imaging sensor may perform this automated LED calibration periodically at a specified calibration frequency.

Figure 7:
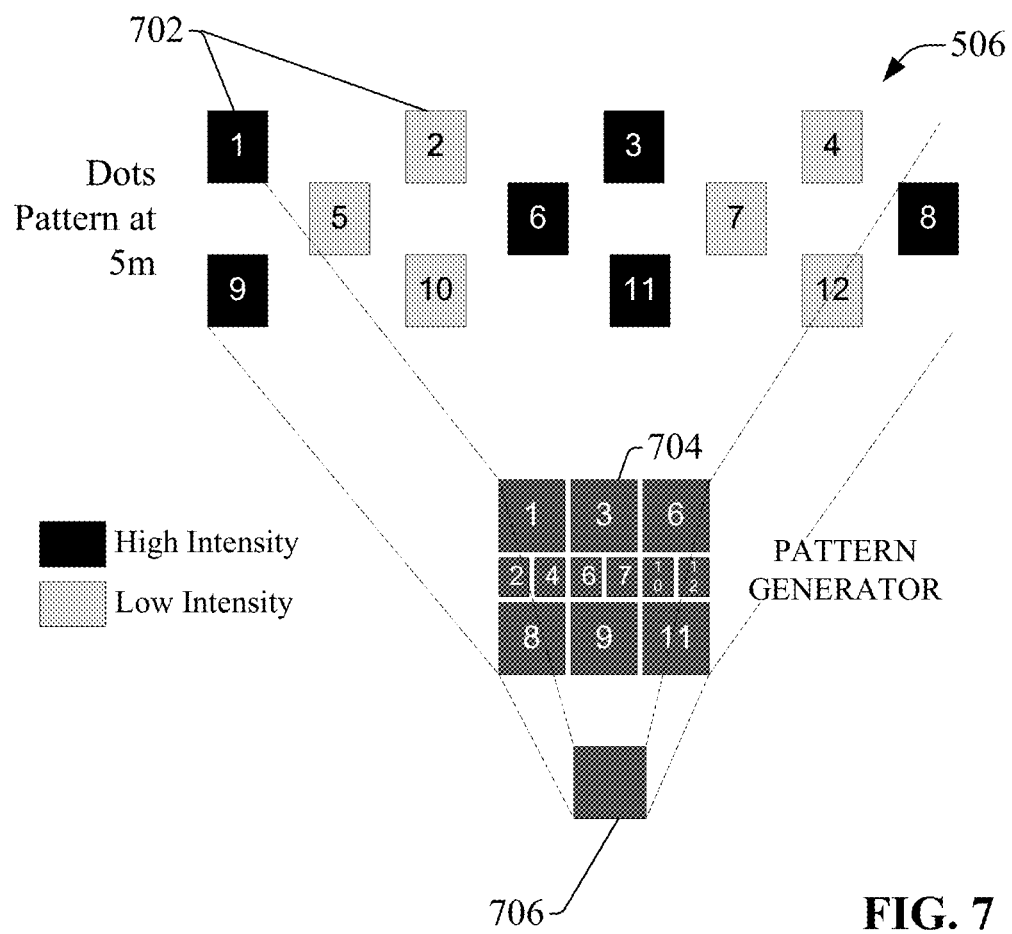
FIG. 7 is a schematic illustrating another design for projecting a light spot pattern.

FIG. 7 is a schematic illustrating another design for projecting spot pattern 506. In contrast to the dual LED design illustrated in FIG. 6, this example employs a single LED 706 and corresponding pattern generator 704. Pattern generator 704 comprises two types of emitting elements—a large element (e.g., elements 1, 3, 6, 8, 9, and 11) for producing high brightness spots, and a smaller element (elements 2, 4, 6, 7, 10, and 12) for producing low brightness spots. Unlike the design illustrated in FIG. 6, the ratio between high and low brightness using this design is fixed by the ratio of the large and small elements. However, since only a single LED is required to produce interlaced spot pattern 506, the design illustrated in FIG. 7 requires half the amount of power needed for the dual LED design of FIG. 6. Moreover, the intensities of the low brightness and high brightness spots can still be adjusted in tandem (without altering the brightness ratios between the two types of spots) using similar measurement and adjustment techniques to those described in connection with FIG. 6. Embodiments of the imaging sensor device 202 that utilize the design depicted in FIG. 7 can include an array of LED/pattern generator pairs to project an interlaced pattern of focused light spots of high and low intensity over an entire viewing field.

Figure 8:
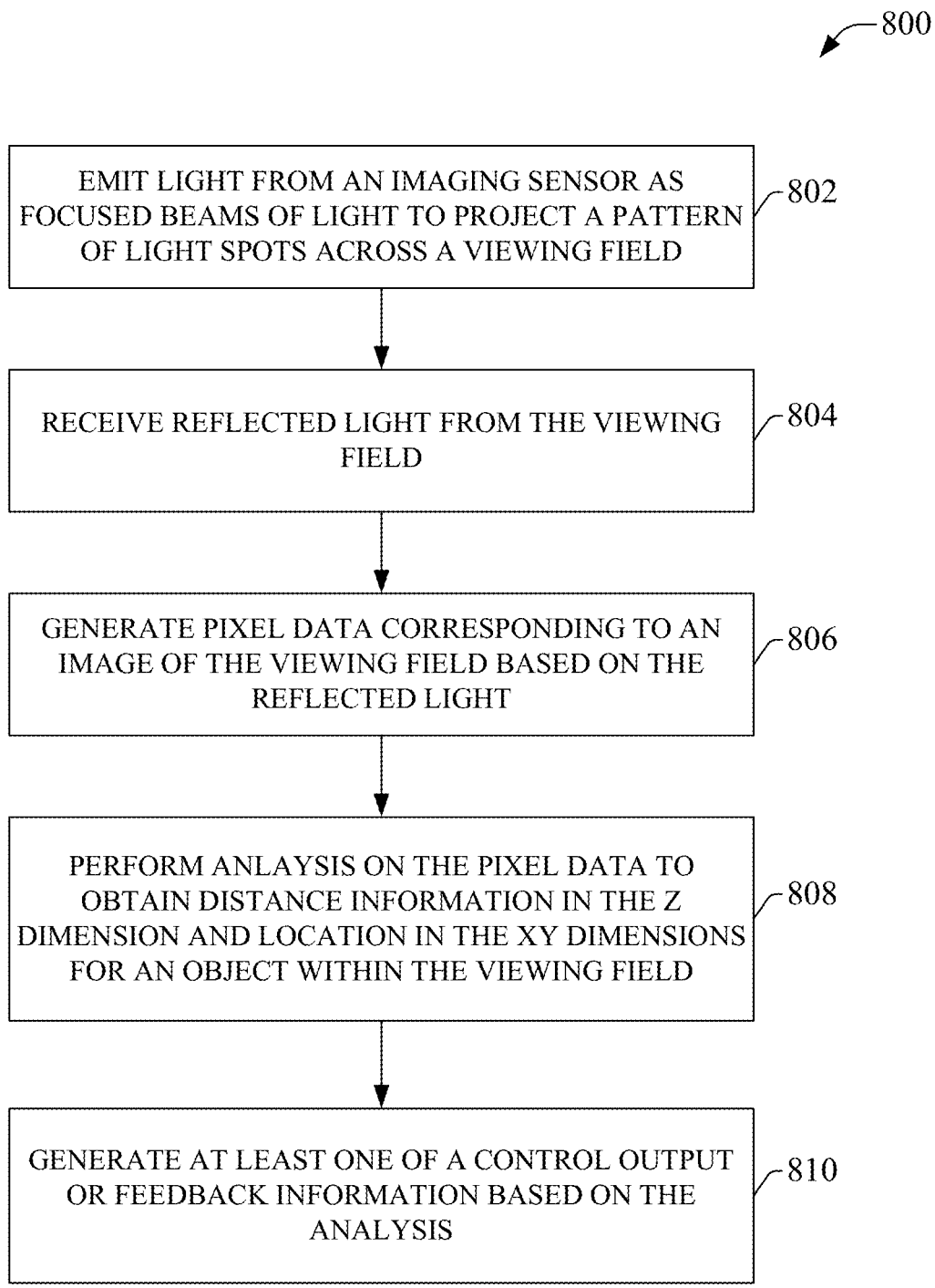
FIG. 8 is a flowchart of an example methodology for performing area monitoring using an imaging sensor device that employs spot matrix techniques.
Figure 9:
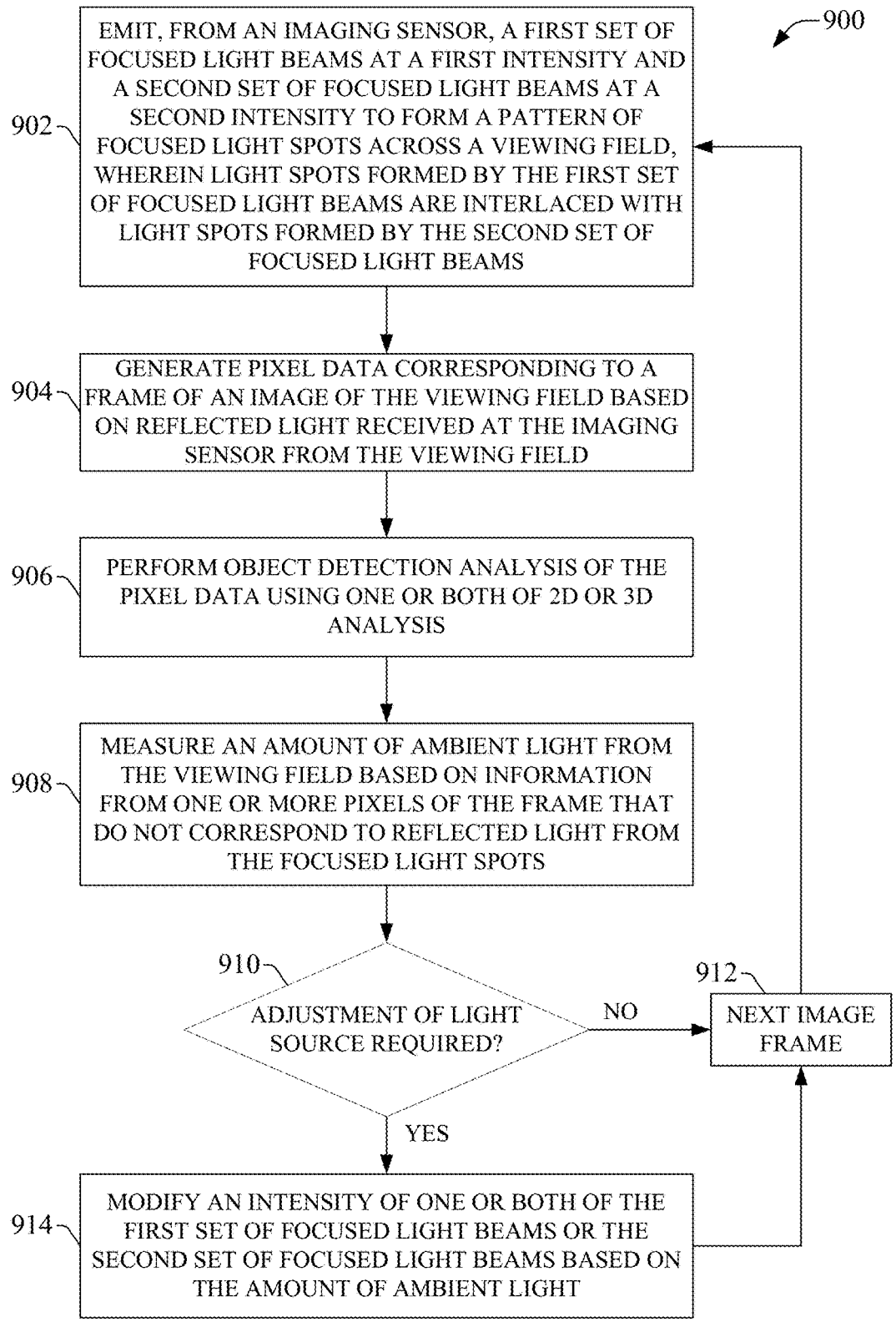
FIG. 9 is a flowchart of an example methodology for performing area monitoring using an imaging sensor device that employs spot matrix illumination with spot intensity modulation.
Figure 10:
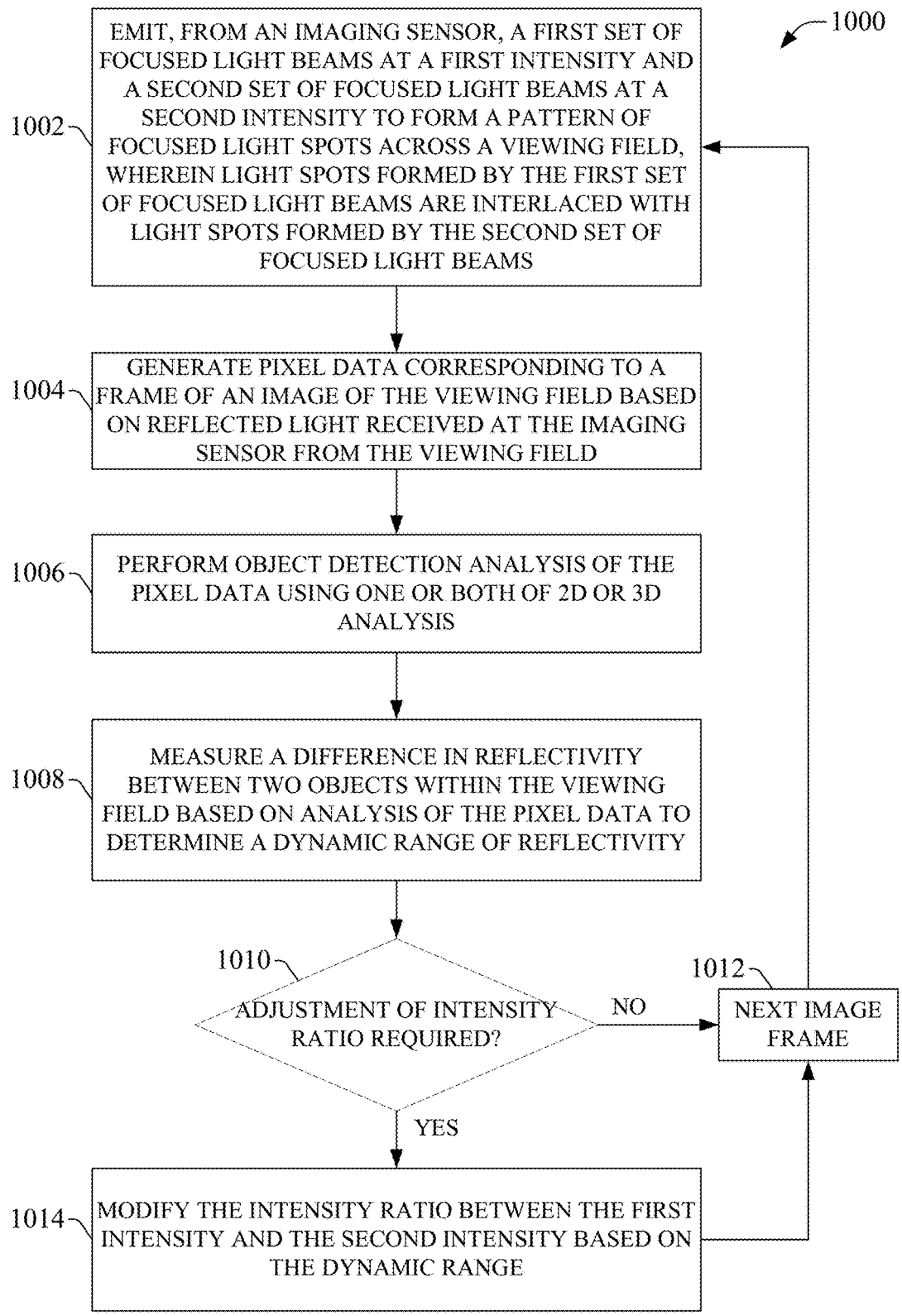
FIG. 10 is a flowchart of an example methodology for performing area monitoring using an imaging sensor device that employs spot matrix illumination with dynamic range adjustment.

FIGS. 8-10 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for performing area or volume monitoring using an imaging sensor device that employs spot matrix techniques. Initially, at 802, light is emitted from an imaging sensor as focused beams of light that produce a pattern of light spots across a viewing field. In one or more embodiments, the imaging sensor can include a light source (e.g., laser, LED, or remote phosphor emitter) that projects light through an emitting lens, which directs the light to an optical structure that concentrates the light into an array of focused light beams. These focused light beams create a pattern of focused light spots across the viewing field. The pattern is managed such that the spots are spaced at a distance that ensures that at least two spots will fall on an object of a specified minimum detection size. Moreover, spots or groups of spots can be directed to particular areas of interest within the viewing field to concentrate light emission to those areas for which accurate object detection is critical, thereby more efficiently utilizing light source energy.

At 804, light reflected from the viewing field is received at a receiving lens of the imaging sensor. At 806, pixel data corresponding to an image of the viewing field is generated based on the reflected light. The pixel data can be based for example, on measurement of the electrical output of the imaging sensors photo-receivers, which is based on the amount of light incident on the surfaces of the photo-receivers. At 808, analysis is performed on the pixel data to obtain distance and location information for an object within the image. At 810, at least one of a control output or feedback information is generated by the imaging sensor based on the analysis.

FIG. 9 illustrates an example methodology 900 for performing area monitoring using an imaging sensor device that employs spot matrix illumination with spot intensity modulation. Initially, at 902 a first set of focused beams are emitted from an imaging sensor at a first intensity, and a second set of focused light beams are emitted from the imaging sensor at a second intensity to form a pattern of focused light spots across a viewing field. The first and second sets of focused light beams are directed such that light spots formed by the first set of focused light beams are interlaced with light spots formed by the second set of focused light beams.

At 904, pixel data corresponding to a frame of an image of the viewing field is generated based on reflected light received at the imaging sensor from the viewing field. At 906, object detection analysis is performed on the pixel data using 3D analysis. At 908, an amount of ambient light from the viewing field incident on the imaging sensor's photo-receiver array is measured based on data from one or more pixels of the frame that do not correspond to reflected light from the focused light spots (e.g., based on data from one or more pixels between pixels corresponding to the focused light spots).

At 910, a determination is made regarding whether an adjustment of the light source that emits the first and second set of focused light beams is required based on the ambient light measurement obtained at step 908. In this regard, the imaging sensor is capable of optimizing object detection reliability by performing ambient light compensation of the projected light intensity. In general, a lower amount of ambient light may require an increase in the intensity of the projected light beams in order to obtain a sufficient SNR to accurately detect objects in the viewing field. Conversely, a higher amount of ambient light may drive the sensor to decrease the intensity of the projected light beams in order to mitigate the risk of pixel saturation.

If it is determined that no adjustment is required at step 910, the methodology moves to step 912, where the next frame of the image is obtained (e.g., by taking a new reading of the imaging sensor's photo-receiver array), and the methodology begins again at step 902 with the next frame of the image. Alternatively, if it is determined at step 910 that an adjustment of the light source is required, the methodology moves to step 914, where the intensity of one or both of the first set of focused light beams or the second set of focused light beams is modified based on the amount of ambient light measured at step 908. This intensity adjustment can be achieved, for example, by changing the intensity of one or more LEDs or lasers that drive the first and second sets of light beams. The methodology then moves to step 912, where the next frame is obtained and the methodology repeats for the next frame.

FIG. 10 illustrates an example methodology 1000 for performing area monitoring using an imaging sensor device that employs spot matrix illumination with dynamic range adjustment. Initially, at 1002 a first set of focused beams are emitted from an imaging sensor at a first intensity, and a second set of focused light beams are emitted from the imaging sensor at a second intensity to form a pattern of focused light spots across a viewing field. The first and second sets of focused light beams are directed such that light spots formed by the first set of focused light beams are interlaced with light spots formed by the second set of focused light beams. The first and second intensities differ by a specified intensity ratio. By projecting both light beams at a relatively high intensity (e.g., the first intensity) and at a relatively low intensity (e.g., the second intensity), spaced such that at least two light spots will be incident on an object of at least a minimum size, the imaging sensor is better able to reliably detect both highly reflective and less reflective objects within the viewing field, since either type of object in the viewing field is ensured to reflect at least two light spots to the imaging sensor that are suitably modulated for the reflectivity of the object.

At 1004, pixel data corresponding to a frame of an image of the viewing field is generated based on reflected light received at the imaging sensor from the viewing field. At 1006, object detection analysis is performed on the pixel data using one or both of 2D or 3D analysis. At 1008, a difference in reflectivity between two objects within the viewing field is measured based on analysis of the pixel data in order to determine a dynamic range for reflectivity associated with the viewing field.

At 1010, a determination is made regarding whether an adjustment of the intensity ratio between the first and second intensities of the light beams is required based on the dynamic range obtained at step 1008. If it is determined that no adjustment is required, the methodology moves to step 1012, where the next image frame is obtained and the methodology repeats for the next frame. Alternatively, if it is determined that an adjustment of the intensity ratio is required, the methodology moves to step 1014, where the intensity ratio between the first intensity and the second intensity is modified based on the dynamic range measured at step 1008, thereby compensating for the dynamic range of reflectivity measured for the viewing field. The methodology then moves to step 1012, where the next image frame is obtained, and the methodology repeats for the next frame.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 11:
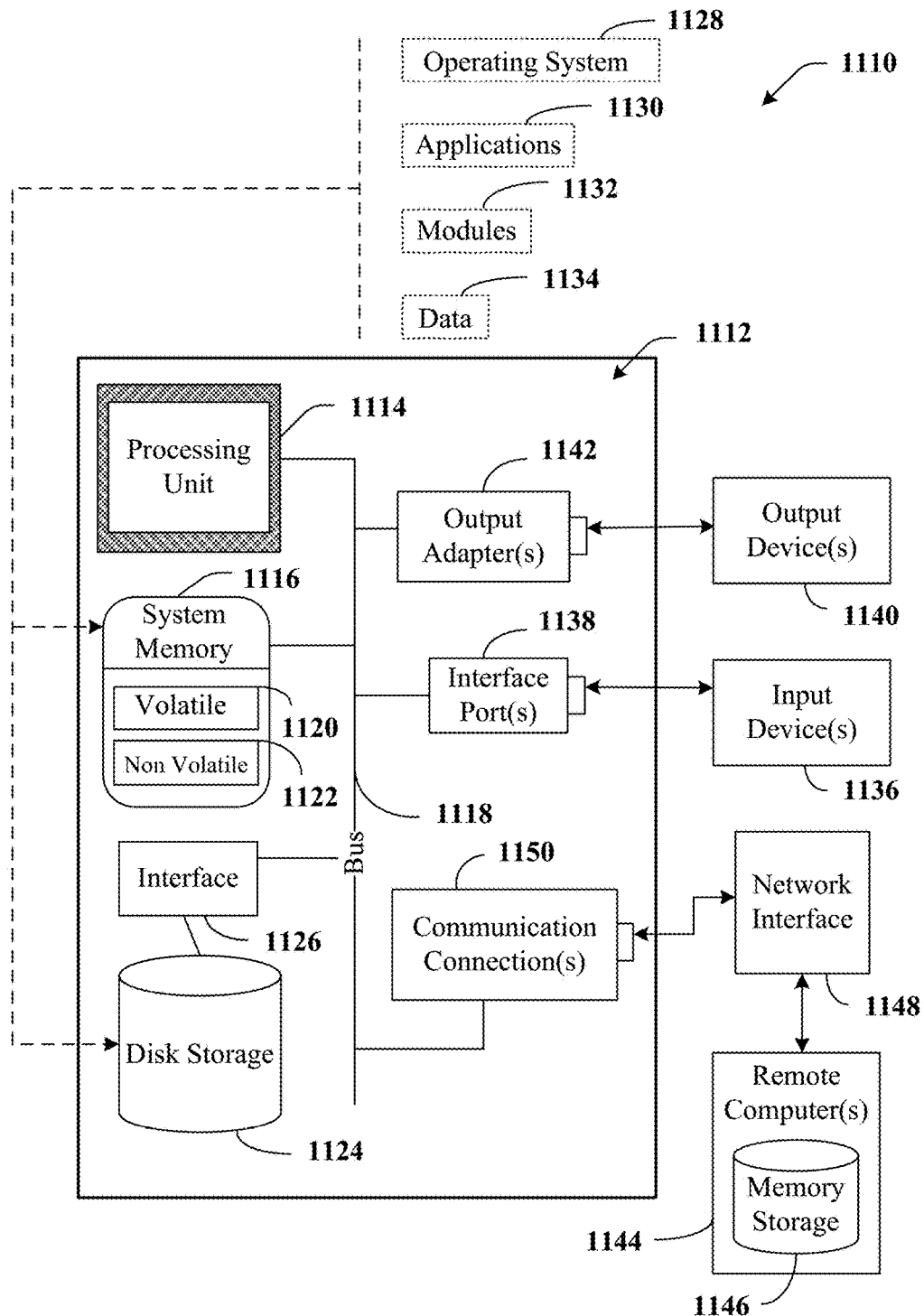
FIG. 11 is an example computing environment.
Figure 12:
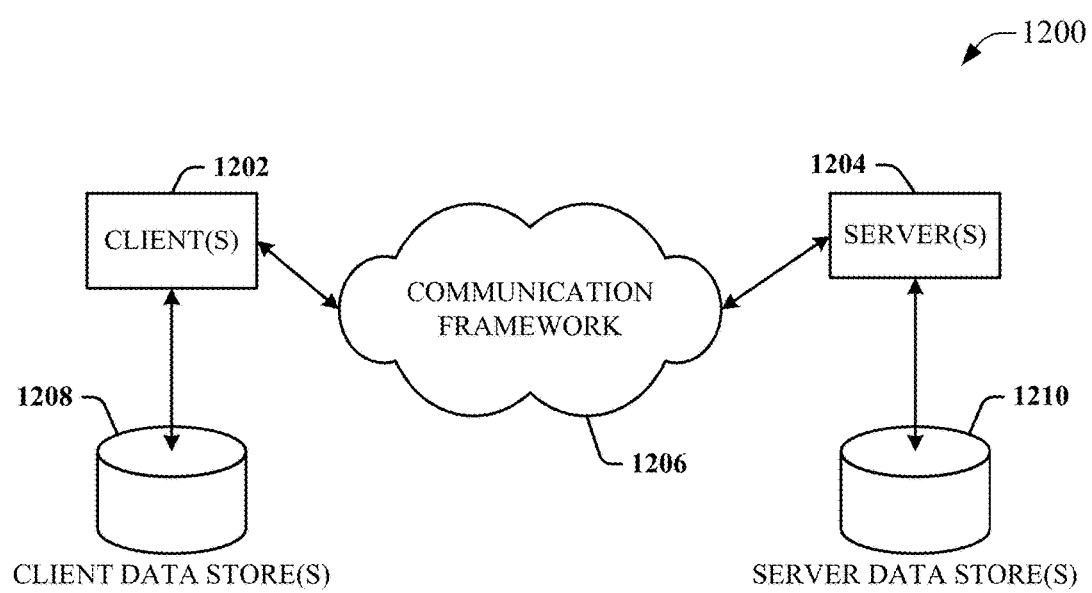
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, an example environment 1110 for implementing various aspects of the aforementioned subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer 1112. System applications 1330 take advantage of the management of resources by operating system 1128 through program modules 1132 and program data 1334 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1346 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/ IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. An imaging sensor device, comprising:
a memory that stores executable components;
a processor, operatively coupled to the memory, that executes the executable components, the executable components comprising:
an illumination component configured to emit focused light beams to a viewing space monitored by the imaging sensor device to produce an array of light spots across the viewing space, the focused light beams comprising a first subset of the focused light beams having a first intensity and a second subset of the focused light beams having a second intensity;
a photo-receiver array configured to receive reflected light from the viewing space and produce pixel data for an image corresponding to the viewing space based on the reflected light;
an image analysis component configured to determine a location of an object in the viewing space based on analysis of the pixel data;
an ambient light measurement component configured to measure an amount of ambient light received at the photo-receiver array; and
an intensity modulation component configured to modify an intensity ratio between the first intensity and the second intensity based on the amount of ambient light.

2. The imaging sensor device of claim 1, wherein the illumination component comprises at least one pattern generator that focuses light from a light source into the focused light beams.

3. The imaging sensor device of claim 2, wherein the at least one pattern generator is configured to focus the light from the light source to produce the first subset of the focused light beams at the first intensity and the second subset of the focused light beams at the second intensity.

4. The imaging sensor device of claim 3, wherein the at least one pattern generator comprises a first set of emitting elements configured to produce the first subset of the focused light beams and a second set of emitting elements configured to produce the second subset of the focused light beams.

5. The imaging sensor device of claim 1, wherein the array of light spots comprise a first set of light spots corresponding to the first subset of the focused light beams interlaced with a second subset of the light spots corresponding to the second subset of the focused light beams.

6. The imaging sensor device of claim 1, wherein the illumination component comprises a first pattern generator that receives light from a first light source element to produce the first subset of the focused light beams and a second pattern generator configured to receive light from a second light source element to produce the second subset of the focused light beams.

7. The imaging sensor device of claim 6, wherein the intensity modulation component is configured to adjust an intensity of at least one of the first light source element or the second light source element based on the amount of ambient light received at the photo-receiver array.

8. The imaging sensor device of claim 1, wherein the intensity modulation component is further configured to modify the intensity ratio based on a measured difference in reflectivity between a first object detected in the viewing space and a second object detected in the viewing space.

9. The imaging sensor device of claim 1, further comprising a control output component configured to generate at least one of a control output or a message output based on an output generated by the image analysis component.

10. The imaging sensor device of claim 1, wherein the ambient light measurement component is configured to measure, as the amount of ambient light, an amount of ambient light received at photo-receivers of the photo-receiver array corresponding to pixels that are between light spots of the array of light spots.

11. A method for optically monitoring a viewing field, comprising:
emitting, by an imaging sensor device comprising at least one processor, focused light beams to a viewing field to yield light spots across the viewing field, the emitting comprising emitting a first subset of the focused light beams at a first intensity and emitting a second subset of the focused light beams at a second intensity;
measuring, by the imaging sensor device, an amount of ambient light received at a photo-receiver array of the imaging sensor device;
modifying, by the imaging sensor device, a ratio of the first intensity to the second intensity based on the amount of ambient light;
generating, by the imaging sensor device, pixel data for an image of the viewing field based on reflected light received from the viewing field; and
determining, by the imaging sensor device, a location of an object in the viewing field based on object location analysis performed on the pixel data.

12. The method of claim 11, wherein the emitting comprises directing light from a light source of the imaging sensor device to at least one pattern generator that concentrates the light into the focused light beams.

13. The method of claim 12, wherein the emitting comprises focusing, by the at least one pattern generator, the light from the light source to yield the first subset of the focused light beams at the first intensity and the second subset of the light beams at the second intensity.

14. The method of claim 13, wherein the emitting comprises directing the light beams to yield a first set of light spots corresponding to the first subset of the focused light beams interlaced with a second subset of the light spots corresponding to the second subset of the focused light beams.

15. The method of claim 14, further comprising:
changing an intensity of the light from the light source based on the amount of ambient light.

16. The method of claim 11, wherein the emitting comprises:
directing light from a first light source element to a first pattern generator at the first intensity to yield the first subset of the focused light beams; and
directing light from a second light source element to a second pattern generator at the second intensity to yield the second subset of the focused light beams.

17. The method of claim 11, further comprising:
measuring a difference in reflectivity between a first object detected in the viewing field and a second object detected in the viewing field; and
modifying the ratio of the first intensity to the second intensity further based on the difference.

18. A non-transitory computer-readable medium having stored thereon instructions that, in response to execution, cause an imaging sensor device comprising a processor to perform operations, the operations comprising:

emitting focused light beams to a viewing space to produce an array of light spots across the viewing space, the focused light beams comprising a first subset of the focused light beams having a first intensity and a second subset of the focused light beams having a second intensity;

measuring an amount of ambient light of the viewing space;

adjusting a ratio between the first intensity and the second intensity based on the amount of ambient light;

generating pixel data for an image of the viewing space based on reflected light received from the viewing space;

performing object identification analysis on the pixel data; and identifying an object in the viewing field based on a result of the object identification analysis.

19. The non-transitory computer-readable medium of claim 18, wherein the measuring the amount of ambient light comprises measuring an amount of the ambient light received at photo-receivers of a photo-receiver array of the imaging sensor device corresponding to pixels located between light spots of the array of light spots.

20. The non-transitory computer-readable medium of claim 18, the operations further comprising:

measuring a difference in reflectivity between a first object detected in the viewing field and a second object detected in the viewing field; and adjusting the ratio between the first intensity and the second intensity further based on the difference in reflectivity.

* * * * *